United States Patent [19]

Goel et al.

[11] Patent Number: 4,698,416

[45] Date of Patent: Oct. 6, 1987

[54] REACTION OF BICYCLIC AMIDE ACETAL WITH SULFUR

[75] Inventors: Anil B. Goel, Worthington; Harvey J. Richards, Columbus, both of Ohio

[73] Assignee: Ashland Oil, Inc., Ashland, Ky.

[21] Appl. No.: 877,059

[22] Filed: Jun. 23, 1986

[51] Int. Cl.[4] ............................................. C08G 75/00
[52] U.S. Cl. .................................... 528/389; 528/210; 548/216; 548/217; 564/123; 564/154; 564/158; 568/18; 568/75
[58] Field of Search ................ 528/389, 210; 548/216, 548/217; 564/123, 154, 158; 568/18, 75

[56] References Cited

U.S. PATENT DOCUMENTS 4,539,376  9/1985  Goel et al. .......................... 525/375

Primary Examiner—Harold D. Anderson
Attorney, Agent, or Firm—John F. Jones

[57] ABSTRACT

The process for preparing novel polymers by the reaction of a bicyclic amide acetal with sulfur at a temperature in the range of from about 25° C. to about 200° C. is described.

9 Claims, No Drawings

REACTION OF BICYCLIC AMIDE ACETAL WITH SULFUR

This invention relates to a process for preparing novel thermoplastic polymeric materials by reaction of a bicyclic amide acetal with sulfur.

The reaction of bicyclic amide acetals with sulfur has not previously been disclosed in the prior art. The thermoplastic polymer produced by the reacion of a bicyclic amide acetal and elemental sulfur is useful as a latent curing agent in the vulcanization of natural rubber and some synthetic rubbers.

The bicyclic amide acetals useful in this invention include those conforming to the Formula

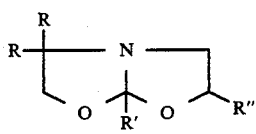

wherein R, R' and R" independently represent hydrogen, an alkyl group or an alkyl ether group having from 1 to 20 carbon atoms, or an alkaryl group having from 7 to 20 carbon atoms, and R and R" may also represent an aryl or aryl ether group having from 6 to 20 carbon atoms.

The reaction of sulfur with bicyclic amide acetals has been found to be generally quite exothermic and the rate of the reaction depends largely on the substituents of the bicyclic amide acetal and follow the general trend: monosubstituted > disubstituted > tetrasubstituted. Furthermore, it has been found that the bicyclic amide acetals wherein R' is an aryl group do not react readily with sulfur under moderate reaction temperature (about 100° C. for 1 hour). The reaction products of bicyclic amide acetal and sulfur are highly viscous to low melting thermoplastic polymers which show strong infrared bands due to the hydroxyl group ($3370\ cm^{-1}$) and amide group ($1620\ cm^{-1}$).

The process of this invention usualy may be carried out in the absence of a solvent, although the use of solvents or diluents is within the scope of this invention. The process is preferably carried out at a temperature in the range of from about 25° C. to about 200° C. and the mole ratio of bicyclic amide acetal to sulfur used in the process may vary from about 4:1 to about 1:4.

The process and products of this invention are further illustrated in the following illustrative examples.

EXAMPLE 1

A bicyclic amide acetal of the foregoing Formula wherein R and R" are hydrogen and R' is methyl and sulfur were allowed to react at 40° to 60° C. in molar ratios of 4:1, 2:1, 1:1 and 1:2. The reactions were found to be exothermic yeilding viscous liquid (4:1 and 2:1) to highly viscous paste (1:1 and 1:2) products. The reaction products were analyzed by NMR in $CDCl_3$ solvent and the stoichiometry of the reactions was determined by observing the disappearance of methyl protons signal at 1.53 ppm of the starting bicyclic amide acetal and the formation of signal at 2.15 ppm. probably due to proton of the amide group. Based on these analyses it was concluded that the molar stoichiometry of the reaction of bicyclic amide acetal with sulfur is in the range of about 1:1.

EXAMPLE 2

To a reactor equipped with a mechanical stirrer, a water condenser, a thermometer with a temperature controller and nitrogen inlet was charged 16 g of sulfur and 64.5 g of a bicyclic amide acetal in which R and R" are hydrogen and R' is methyl. The resulting mixture was stirred and heated to about 50° C. An exothermic reaction occurred and the reaction temperature jumped above 100° C. The reaction was continued at 100° C. for 15 minutes and the resulting highly viscous red colored liquid was analyzed by GLC which showed the consumption of almost all the starting bicyclic amide acetal. The infrared spectrum of the product showed strong bands at $3370\ cm^{-1}$ (hydroxyl group) and $1620\ cm^{-1}$ (amide group) suggesting the product to be one with a ring opened bicyclic amide acetal.

EXAMPLE 3

The procedure of Example 2 was followed using 13 g of the bicyclic amide acetal described in Example 2 and 6.3 g of sulfur. The resulting red thermoplastic showed infrared bands at $3370\ cm^{-1}$ and $1620\ cm^{-1}$.

EXAMPLE 4

The procedure of Example 2 was followed using 26.3 g of a bicyclic amide acetal of the foregoing formula wherein R nd R' are methyl and R" is $CH_2OC_6H_5$ and 6.3 g of sulfur. The resulting red thermoplastic showed infrared bands at $3370\ cm^{-1}$ and $1620^{-1}$.

We claim:

1. The process for preparing a polymer comprising reacting a bicyclic amide acetal having the formula

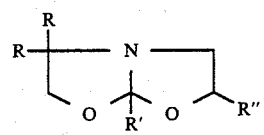

wherein R, R' and R" independently represent hydrogen, an alkyl group or an alkyl ether group having from 1 to 20 carbon atoms or an alkaryl group having from 7 to 20 carbon atoms, and R and R" also independently represent an aryl or an aryl ether group having from 6 to 20 carbon atoms, with sulfur at a temperature in the range of from about 25° C. to about 200° C.

2. The process of claim 1 wherein the mole ratio of bicyclic amide acetal to sulfur used in the process falls in the range of from about 4:1 to about 1:4.

3. The process of claim 2 wherein the amide acetal is one in which R and R" represent hydrogen and R' represents methyl.

4. The process of claim 2 wherein R and R' represent methyl and R" represents $CH_2OC_6H_5$.

5. The polymer composition produced by the process of claim 1.

6. The composition of claim 5 wherein the bicyclic amide acetal is one having the formula

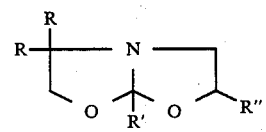

wherein R, R' and R" independently represent hydrogen, an alkyl group or an alkyl ether group having from 1 to 20 carbon atoms or an alkaryl group having from 7 to 20 carbon atoms, and R and R" also independently represent an aryl or an aryl ether group having from 6 to 20 carbon atoms.

7. The composition of claim 6 wherein the mole ratio of bicyclic amide acetal to sulfur used in the process falls in the range of from about 4:1 to about 1:4.

8. The composition of claim 7 wherein the amide acetal is one in which R and R" represent hydrogen and R' represents methyl.

9. The composition of claim 7 wherein R and R' represent methyl and R" represents $CH_2OC_6H_5$.

* * * * *